United States Patent [19]
Scott et al.

[11] Patent Number: 5,171,023
[45] Date of Patent: Dec. 15, 1992

[54] TECHNIQUE FOR IN-PLACE CLEANING OF A SEALING STRUCTURE

[76] Inventors: Robert J. Scott, Rte. 41, Silver Lake, N.H. 03875; Robert A. Reynolds, 7 Henderson Rd., Woburn, Mass. 01801; Michael B. Comer, 7 Marcus Rd., Wilmington, Mass. 01887; John T. Mabon, 149 Cotuit St., N. Andover, Mass. 01845

[21] Appl. No.: 657,432

[22] Filed: Feb. 19, 1991

[51] Int. Cl.⁵ .......................... F16J 15/34; B08B 3/02
[52] U.S. Cl. .......................................... 277/3; 277/24; 277/70; 277/74; 277/75; 277/93 R; 277/93 SD; 134/114; 134/201
[58] Field of Search ................... 277/3, 24, 70, 74, 75, 277/76, 81 R, 91, 93 R, 93 SD, 15; 134/114, 201

[56] References Cited

U.S. PATENT DOCUMENTS

| | | | |
|---|---|---|---|
| 3,589,738 | 6/1971 | Tracy | 277/74 |
| 4,136,886 | 1/1979 | Sjoholm et al. | 277/24 |
| 4,721,313 | 1/1988 | Pennink | 277/3 X |
| 4,819,948 | 4/1989 | Merrifield | 277/3 |
| 4,844,124 | 7/1989 | Stich et al. | 277/15 X |
| 4,961,678 | 10/1990 | Janocko | 277/74 X |
| 5,072,949 | 12/1991 | Lopperi | 277/81 R X |
| 5,076,589 | 12/1991 | Marsi | 277/3 |

*Primary Examiner*—Allan N. Shoap
*Assistant Examiner*—James Folker

[57] ABSTRACT

A technique for providing in-place cleaning of a sealing structure for a rotating shaft in a materials processing apparatus wherein, during a cleaning operation, cleaning liquid is supplied in the form of a plurality of jets thereof from a source thereof to a rotating member having a sealing element, such as an O-ring, positioned about the rotating shaft. The cleaning fluid produced a scrubbing action on critical surfaces of the sealing structure to clean them. A plurality of jets of a drying fluid, such as pressurized air, is then supplied from a source thereof to the critical surfaces to remove excess cleaning liquid and to thoroughly dry such surfaces. The cleaning and drying operation can be activated to take place automatically and in-place using a pre-programmed processor without having to disassemble the sealing structure.

18 Claims, 4 Drawing Sheets

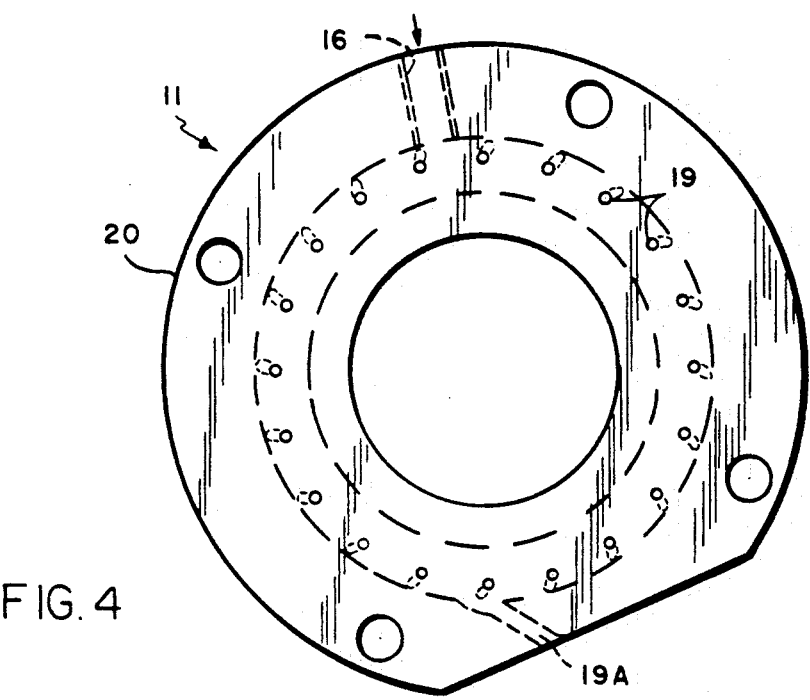
FIG. 4
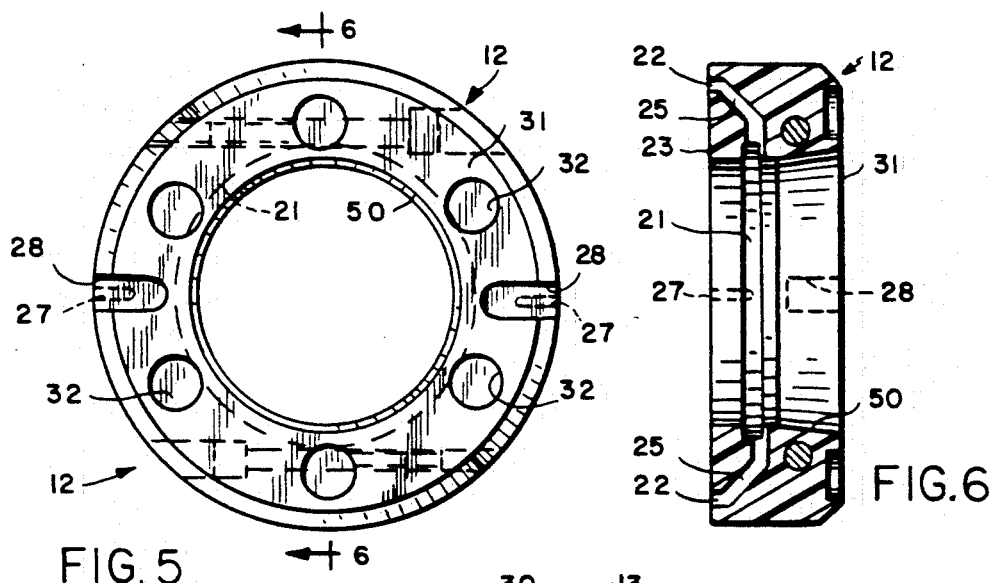
FIG. 5
FIG. 6
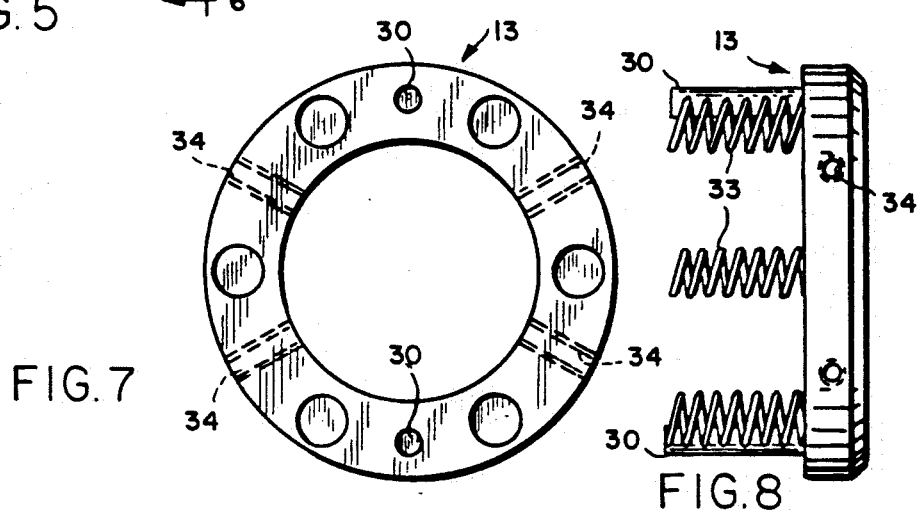
FIG. 7
FIG. 8

TECHNIQUE FOR IN-PLACE CLEANING OF A SEALING STRUCTURE

INTRODUCTION

This invention relates generally to sealing structures for use with one or more mechanically rotating shafts in a materials processing apparatus, such as a food processing apparatus, and, more particularly, to a unique technique for permitting such a sealing structure to be readily and conveniently cleaned in place so as to maintain the structure in a clean and sanitary condition for use.

BACKGROUND OF THE INVENTION

An apparatus for processing materials, such as food materials which are to be blended or mixed therein, for example, often utilizes a mechanically rotating shaft for rotating a suitable blending or mixing mechanism, e.g. agitator blades, attached thereto. The shaft must be sealed, often at both ends thereof, against leakage of such materials. Such leakage is particularly a problem when using fine powdered food materials, for example, and/or where a slight misalignment of the shaft exists which can cause shaft run out up to as high as ⅛ inch in some types of apparatus.

The surfaces of such seal structures tend to become clogged with the food materials involved and require frequent maintenance and cleaning thereof so as to maintain acceptable sanitary operating conditions and to prevent unacceptable leakage of materials during operation of the apparatus. Up to now, conventional sealing structures using packing materials normally must be disassembled and the components thereof cleaned separately, usually manually. The packing used in the seal structure usually tends to deteriorate and must be replaced. The overall structure must then be re-assembled for use. Such maintenance and cleaning is not only time consuming but it can also increase the costs of operation, due both to the labor required as well as to the costs of the replacement packing material.

It is desirable to devise a sealing structure which can be thoroughly and consistently cleaned in place without disassembly thereof. Such a cleaning technique should be readily and conveniently usable by an operator and should be capable of being easily activated to provide an automatic cleaning operation whenever desired. While there may be an initial increase in cost in providing such an in-place cleaning structure, the overall operating costs, over the useful life of the apparatus, in time, labor, and materials can be considerably reduced.

BRIEF SUMMARY OF THE INVENTION

In accordance with the invention, a sealing structure using a rotating member, i.e., one which rotates with the rotation of the shaft, having a suitable sealing element, such as an O-ring seal therein, is designed so that, when in-place cleaning thereof is desired, the cleaning operation can be readily and conveniently activated by an operator. In accordance with such operation, a cleaning fluid, such as water, is suitably delivered under pressure to a fixedly mounted member of the sealing structure from which it can be supplied as a plurality of jets thereof so as to impinge on and flow by critical surfaces of the structure in a manner such as to produce an effective scrubbing action thereon. When the flow of cleaning water is stopped, a drying fluid, such as air supplied under pressure, is then delivered to such surfaces so as to provide a thorough removal of the cleaning fluid therefrom and a drying thereof before the normal blending or mixing operation is resumed. A suitable blow down port is provided in the fixed member to assist in and insure the removal of all of the cleaning water therefrom.

The cleaning and drying procedure is preferably pre-programmed using suitable processor circuitry for providing for an automatic sequence of steps for activating the valves used in the cleaning and drying process, which sequence can be readily initiated by an operator, e.g., during apparatus downtime periods, for example.

DESCRIPTION OF THE INVENTION

The invention can be described in more detail with the help of the accompanying drawings wherein FIG. 1 depicts a perspective view of a sealing structure used in a processing apparatus in accordance with the invention;

FIG. 4 depicts a plan view of a surface of the fixed seal face member of the sealing structure of FIG. 1;

FIG. 5 depicts a plan view of a surface of the rotating member of FIG. 5;

FIG. 6 depicts a side view in section of the rotating member of the sealing structure of FIG. 1;

FIG. 7 depicts a plan view of a surface of the collar member of the sealing structure of FIG. 1;

FIG. 8 depicts a side view of the collar member of FIG. 7;

Figure 1:
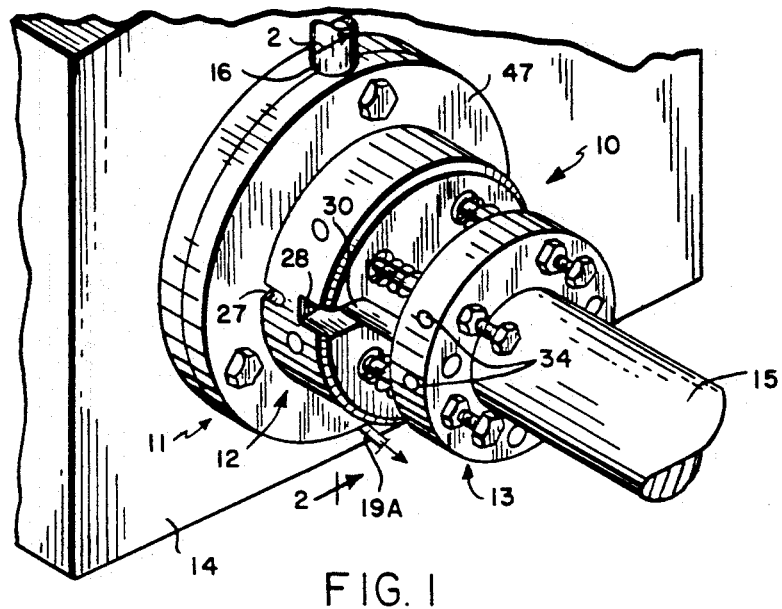
Figure 2:
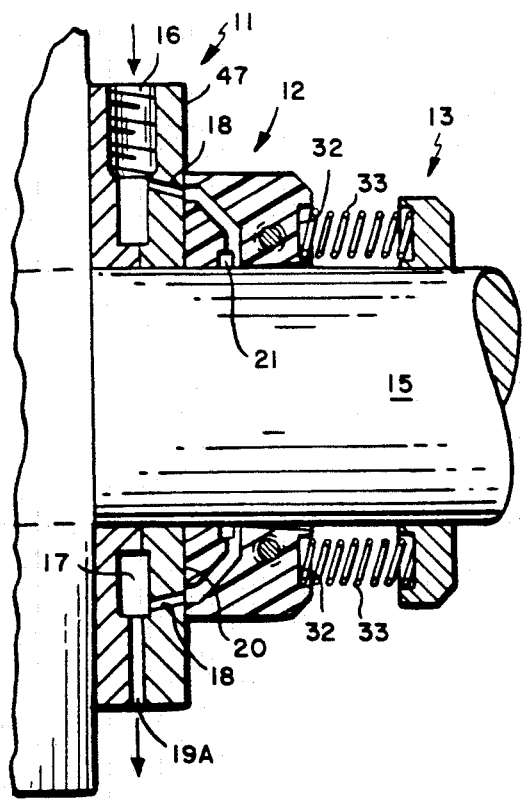
FIG. 2 depicts a side view in section in the place 2—2 of the sealing structure of FIG. 1 during normal operation of the apparatus.
Figure 3:
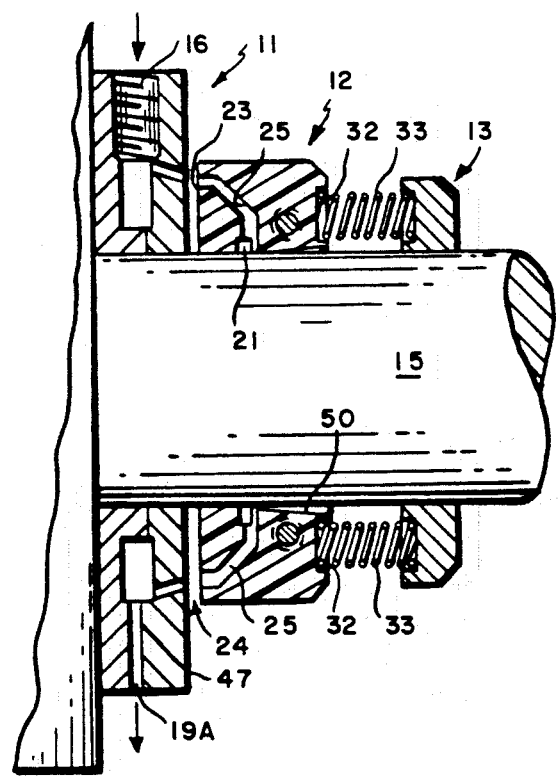
FIG. 3 depicts a side view in section of the sealing structure of FIG. 2 during a cleaning operation.

As can be seen in FIGS. 1-3, for example, a sealing structure 10, showing a preferred embodiment of the invention, includes a fixedly mounted seal face member 11, a rotating O-ring member 12, and a collar member 13.

Seal face member 11 having an opening for a shaft 15 is fixedly mounted to the body 14 of an apparatus, such as a food processing apparatus, using a suitable gasket (not shown) between the contact surfaces thereof. The rotatable shaft 15 rotates relative to the body 14 and the seal face component 11. Shaft 15 can have an appropriate blending or mixing mechanism, e.g., agitator blades, (not shown) affixed thereto within the main body of the apparatus, as would be well known to those in the art, for blending or mixing of food materials supplied thereto. It has been found that the sealing structure 10 of the invention is particularly useful in an apparatus for the blending or mixing of dry food materials, often in relatively fine powdered form. Shaft 15 is suitably activated by an appropriate a-c motor (not shown) as would be well-known to those in the art. The shaft may be rotated in a particular embodiment at a speed of about 40 r.p.m. when used for the mixing of fine powdered materials, for example.

Seal face member 11 has an inlet port 16 into which a cleaning fluid, such as water, or a drying fluid, such as air, can be introduced for flow therethrough under pressure to an interior cavity or manifold 17 therein. Manifold 17 communicates with a plurality of fluid outlet jets 19 via channels 18 which carry the pressurized fluid from manifold 17 thereto. Outlet jets 19 are in a circular path on the surface 20 of seal face component 11 (see FIG. 4) and provide for the substantially simultaneous ejection of the pressurized fluid outwardly from surface 20. Channels 18 are preferably not directed outwardly from surface 20 in a head-on direction but are angled inwardly toward shaft 15 and are also angled in a direction opposite to the direction of rotation of the shaft, as discussed below. A blowdown port 19A is located at the bottom of seal face member 11 in communication with manifold 17 to assist in the ready exit of any cleaning water which may accumulate in the lowermost region of manifold 17 during the cleaning operation.

The rotating member 12 has an O-ring 21 mounted in a suitable groove therein about the body of shaft 15 and at least one pair of oppositely disposed input ports 22 (see FIG. 6) are provided at a surface 23 thereof in communication with an interior channel 25 therein. The pressurized fluid ejected from jets 19 at surface 20 of seal face member 11 is directed toward surface 23 of rotating O-ring member 12 which latter member rotates with shaft 15 but is effectively free to move longitudinally along the surface of the shaft.

During operation of the apparatus, when no fluid is being ejected from jets 19, the surfaces 20 and 23 are essentially maintained in contact as shown in FIG. 2 while, when pressurized fluid is being ejected from jets 19, the rotating member 12 is caused to move longitudinally along the shaft to produce a space 24 between such surfaces as shown in FIG. 3. Rotating member 12 can be made of a suitable low friction plastic material such as Teflon, for example.

Channel 25 formed in rotating O-ring member 12 between the oppositely disposed inlet ports on surface 23 thereof extends along the region of O-ring 21 and the O-ring groove in which it is positioned. Such ports 22 are arranged so as to rotate along a circular path which coincides with the path of the plurality of jets 19 placed on surface 20 of seal member 11.

When such inlet ports 22 are aligned, and their positions are essentially coincident, with oppositely disposed ones of the jets 19, fluid under pressure flows inwardly through the ports into channel 25. When inlet ports 22 move to a position where they are not aligned with any of the jets 19 (i.e., they are positioned between jets), no fluid flows through them into channel 25. Accordingly, pressurized fluid is supplied to channel 25 effectively in a pulsed manner to produce an effective scrubbing action on the exposed surfaces of the O-ring and O-ring groove.

A pair of oppositely disposed grooves 27 are formed at the outer periphery of surface 23 of rotating member 12, the function of which is discussed in more detail below. A pair of peripherally oriented drive pin slots 28 for receiving a pair of drive pins 30 mounted in collar member 13 are formed in the opposite surface 31 of rotating member 12. A plurality of counterbores 32 are also formed in surface 31 for receiving spring elements 33 of collar member 13, as discussed below.

Collar member 13 is affixed to shaft 15 by the use of appropriate set screws 34 when drive pins 30 have been inserted into drive pin slots 28, the spring elements 33 being inserted into their corresponding counterbores 32.

Collar member 13 holds the O-ring rotating member 1 in position between the collar member 13 and the seal face member 11, the springs 31 forcing the surfaces 20 and 23 into contact with each other during a blending or mixing operation. Rotating member 12 thereby provides an O-ring seal about shaft 15 to prevent leakage of the materials being mixed through the sealing structure 10.

Over time, during the blending or mixing operation, the normally very fine particles of the materials being blended tend to enter the sealing structure and adhere to the surfaces thereof such as the surfaces 20 and 23, the exposed surfaces in the vicinity of the O-ring and the O-ring groove of rotating member 12, as well as in the surfaces forming the clearances between the shaft and each of the members of the sealing structure. It is desirable to be able to thoroughly clean such surfaces so as to remove the fine particles therefrom in order to prevent deterioration of the O-ring and to maintain the seal structure 10 in a clean and sanitary condition. Moreover, it is desired to perform such a cleaning operation in place, i.e., without having to disassemble the seal structure and without having to replace the O-ring thereof each time a cleaning operation takes place.

In accordance therewith, when the apparatus is in a non-operative state, i.e., at a down time period, the invention is arranged so that an operator can activate an in-place cleaning operation which follows a sequence of pre-programmed steps to achieve a thorough cleaning and drying thereof over a reasonable time period. When the cleaning and drying operation is completed, the seal structure is placed in its desired cleaned and sanitary state so that normal blending or mixing can be resumed.

Figure 9:
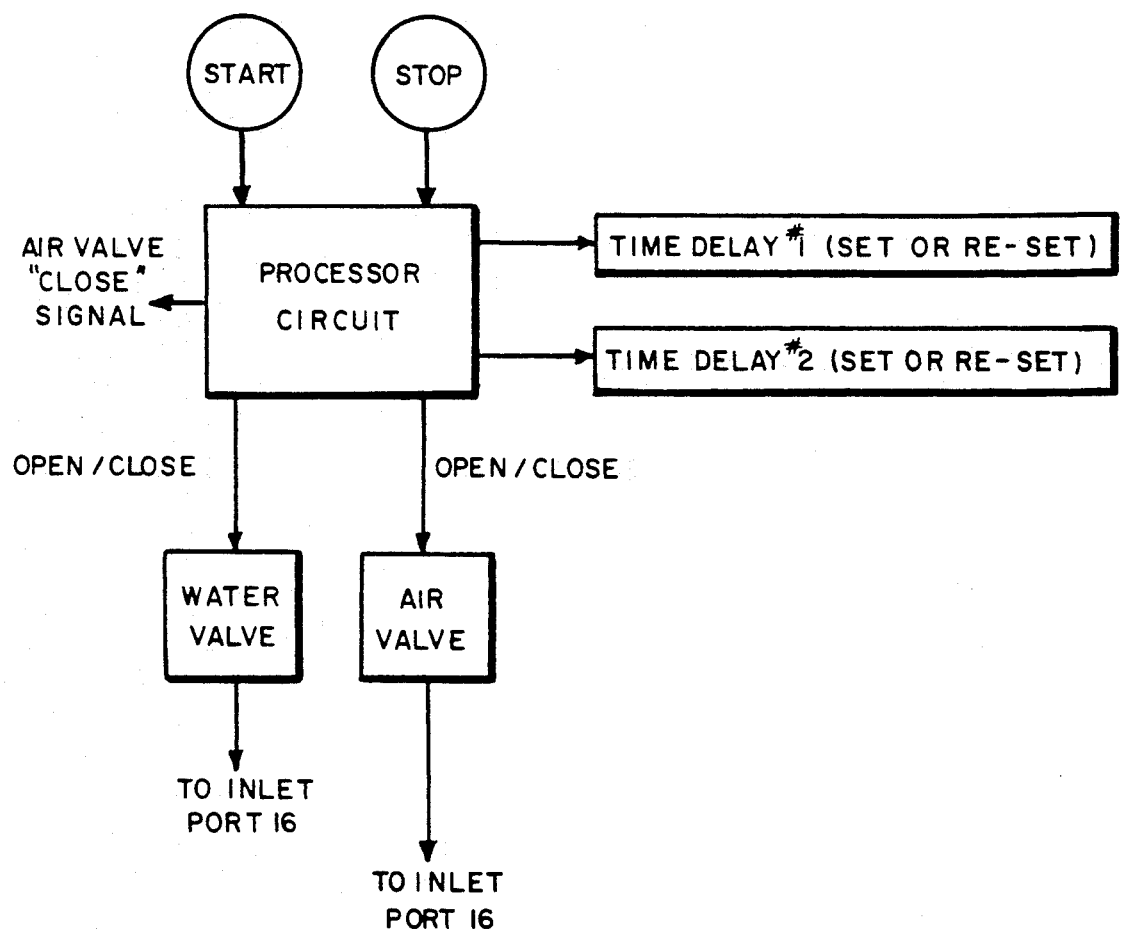
FIG. 9 depicts a block diagram of a system for use in providing an in-place cleaning and drying operation for the sealing structure of FIGS. 1-8.
Figure 10:
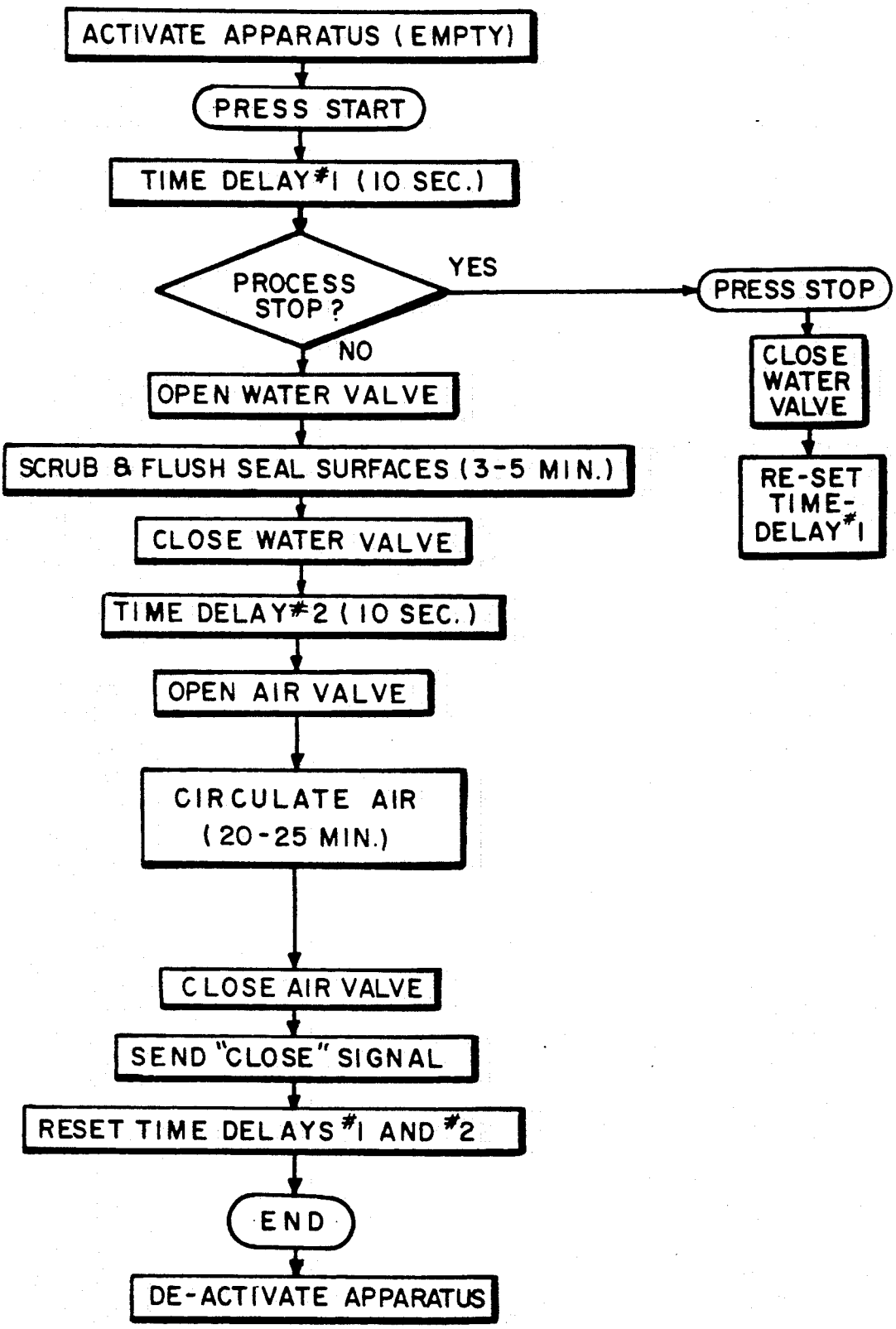
FIG. 10 depicts a flow chart showing a sequence of steps used in an in-place cleaning and drying operation for the sealing structure of FIGS. 1-8.

The sequence of steps for such a cleaning and drying operation is shown in FIG. 10 and can be activated using suitable processor circuitry depicted in the block diagram of FIG. 9. The design of a program for use by processor circuitry for such purpose would be well within the skill of those in the art once the steps, as shown in the flow chart of FIG. 10, are known.

In accordance therewith, when cleaning is desired, the apparatus is activated by the operator for rotation of the blending mechanism effectively in an empty state, i.e., a state in which no powder materials are being supplied thereto. The speed of rotation is normally selected to be the same as that used for a blending or mixing operation. When the operator presses a "Start" button, a first time delay is set by the program (which is designed for implementation by the processor circuit) before the cleaning operation begins. The operator has an opportunity during such time delay to determine whether the cleaning operation is to proceed or is to be stopped. If, for whatever reason, the operator desires to stop the operation, the operator can press a "Stop" button so that the cleaning water valve remains closed and so that no cleaning operation can commence. Although not limited thereto, a time delay of about 10 seconds, for example, has been found to be satisfactory for such purpose. After such time delay, the first time delay is then reset and no cleaning occurs until the operator again begins the process by activating the Start button.

If the operator wishes the cleaning process to continue, the pre-programmed operation of the processor circuitry causes the water valve to be opened so that water under pressure (although not limited thereto, a pressure of about 90 p.s.i. has been found to be an effective pressure for such purpose, for example) enters inlet port 16 of seal face member 11 into manifold 17 thereof. The pressurized water is thereupon directed to jets 19 from which it is sprayed onto surface 23 of O-ring rotating member 12, the force thereof thereby causing member 12 to move slightly in a longitudinal direction along shaft 15 in opposition to the force of springs 33 so as to provide a space 24 between surfaces 20 and 23. It is found that an effective scrubbing action occurs if the water is directed from jets 19 at an angle other than the normal to surface 23. An effective scrubbing action has been found to occur when the sprays from jets 19 are directed at a selected angle with respect to, and toward, the axis of rotation of the rotating member 12 and shaft 15 and also at a selected angle in a direction opposite to the direction of rotation of such shaft. For example, each of such angles can be selected to be about 20° in a particular practical embodiment of the invention, although other angles can be selected within reasonable ranges thereof and will be found effective in other embodiments.

The continual supply of pressurized water from jets 19 causes a scrubbing action to occur on surfaces 20 and 23 so as to clean particles of food material therefrom, the cleaning water being directed away from such surfaces via space 24 which acts to carry away the water and the particles. Cleaning water which is directed under pressure into grooves 27 is projected outwardly from the grooves to produce, in effect, a pressurized fountain of water therefrom about the periphery of surface 23 which water is generally directed toward the peripheral exposed portion 47 of surface 20 which extends beyond the edge of surface 23 so as to enhance the scrubbing action on such surface portion 47.

As the O-ring inlet ports pass by corresponding pairs of jets 19, pressurized water is supplied in a pulsed manner to channel 25 so as to produce a further effective scrubbing action of both the O-ring and the O-ring groove surfaces within rotating member 12, the pressurized water and particles therein being carried outwardly from channel 25 via the clearances in either direction between the shaft and the interior surface of member 12 adjacent the shaft. Further, cleaning water is also directed into the clearance space between the shaft and the shaft opening of fixed seal member 11. Accordingly, all of the critical surfaces of the sealing structure 10 are thoroughly scrubbed and flushed during the pressurized water supply operation of the overall cleaning sequence, which scrubbing action can be set to occur over a suitably selected time period as desired, e.g., 3–5 minutes (FIG. 10), after which time the water valve is closed.

Preferably a second time delay also then occurs to permit the water valve to fully close before the air valve is opened. During such time delay some of the excess water also tends to drain off the cleaned surfaces. Although not limited thereto, a second time delay of about 10 seconds, for example, inserted before the drying portion of the sequence begins has been found to be satisfactory for such purpose, after which time delay the drying air valve is opened. Pressurized air, (although not limited thereto, a pressure of about 90 p.s.i. has been found to be effective for such purpose, for example) enters inlet port 16 and is projected outwardly from jets 19 in the same manner as the cleaning water to be directed against surfaces 20 and 23 so as to further carry excess water therefrom and to dry such surfaces, including the extended surface portion 47 at the periphery of surface 20. Drying air also enters channel 25 to dry the O-ring and O-ring groove regions, the flow of pressurized air occurring in the same manner as that of the pressurized water during the cleaning portion of the sequence. Air under pressure also flows into the shaft clearance spaces both in rotating member 12 and in fixed member 11. Air also flows outwardly from blowdown port 19A to thoroughly remove any water in which may have accumulated at the lower end of manifold 17.

As a result of the pressurized air flow over a selected time period (about 20–25 minutes in a particular embodiment, for example) all of the critical surfaces are thoroughly dried, after which time period the air valve is closed. The operator is appropriately notified when the drying operation has been completed and both time delays are re-set. The operator de-activates the apparatus (alternatively the apparatus can be automatically de-activated), the apparatus then being ready for use for a blending or mixing operation.

As mentioned above, often the axis of the shaft is somewhat misaligned so as to cause shaft run-out (in effect a "wobble" in the shaft rotation). Such run-out reduces the effectiveness of the sealing operation of a seal structure. In order to overcome the reduced effectiveness of the seal due to run-out, the clearance space 50 between the shaft and the portion of the shaft opening in rotating member 12 adjacent the collar member 13 is provided with a slight taper 50. The angle of taper relative to the direction of the axis of rotation will depend on the expected run-out which might occur. It has been found that a taper of about 3° with respect to the axis of rotation of rotating member 12 is effective for such purpose in a practical embodiment of the invention, although a different angle may be selected in other embodiments. It has been found that the presence of such a slightly tapered clearance enhances the sealing effectiveness of the seal structure in the presence of a relatively large degree of shaft misalignment producing run-out approaching as high as ⅛ inch.

While the particular embodiment described with reference to FIGS. 1–10 describes a preferred embodiment for use with a blending or mixing apparatus for fine powdered materials, such as food materials, modifications thereof and uses in other types of apparatus requiring one or more rotating shafts for processing or handling other materials may occur to those in the art within the spirit and scope of the invention. Hence the invention is to not be construed as limited to the particular embodiment described above, except as defined by the appended claims.

What is claimed is:

1. A sealing structure for use with a rotating shaft, said sealing structure comprising
   rotating means, located about said shaft for rotation therewith, including
   an O-ring sealing element positioned in a groove in said rotating means;
   channel means formed in said rotating means for communication with said O-ring sealing element; and
   means for providing access to said channel means; and
   fluid supplying means for supplying a plurality of jets of pressurized fluid to a surface of said rotating means and to said sealing element via said access providing means for flow through said channel means past said O-ring sealing element and said groove to impinge upon said O-ring sealing element and said groove.

2. A sealing structure in accordance with claim 1 wherein said fluid supplying means supplies jets of a pressurized cleaning liquid for cleaning in-place the surfaces of said O-ring sealing element and said groove.

3. A sealing structure in accordance with claim 2 wherein said fluid supplying means supplies jets of a pressurized drying fluid for drying in-place the surfaces of said O-ring sealing element and said groove.

4. A sealing structure in accordance with claim 3 and further including a resilient collar means for retaining said rotating means on said shaft between said further means and said collar means so that said rotating means is free to move longitudinally along said shaft when pressurized fluid is supplied to the surface thereof.

5. A sealing structure in accordance with claim 1 wherein said fluid supplying means includes
  a manifold means in communication with a plurality of outlet jet means;
  means for inserting fluid under pressure to said manifold means to supply said plurality of jets of pressurized fluid to said rotating means from said outlet jet means;

6. A sealing structure in accordance with claim 5 wherein said fluid supplying means includes a blowdown port in communication with said manifold means to provide for the exit of fluid therefrom.

7. A sealing structure in accordance with claim 5 wherein said shaft rotates in a direction of rotation about an axis and said plurality of jets of pressurized fluid are supplied to the surface of said rotating means at a selected angle with respect to the axis of said shaft and at a selected angle in a direction opposite the direction of rotation of said shaft.

8. A sealing structure in accordance with claim 7 wherein said angles are selected to be about 20°.

9. A sealing structure in accordance with claim 4 wherein clearance spaces are present between said shaft and interior surfaces of said rotating means pressurized fluid being further supplied to said clearance spaces.

10. A sealing structure in accordance with claim 9 wherein a portion of the clearance space between an interior surface of said rotating means and said shaft is tapered.

11. A sealing structure in accordance with claim 10 wherein said rotating means rotates about an axis and said taper is provided at a side of said rotating means which is adjacent said collar means, said taper forming a selected angle with respect to the axis of rotation of said rotating means.

12. A sealing structure in accordance with claim 11 wherein said taper forms an angle of about 3° with respect to said axis of rotation.

13. A sealing structure in accordance with claim 3 and further including an operating system for use therewith for providing an in-place cleaning and drying operation of said sealing structure, said operating means including
  first valve means for controllably supplying cleaning liquid to said fluid supplying means;
  second valve means for controllably supplying drying fluid to said fluid supplying means;
  processor means for controlling the operation of said first and second valve means to provide, when initiated, a pre-programmed sequence of operations of said first and second valve means.

14. A sealing structure in accordance with claim 13 wherein said pre-programmed sequence of operation includes
  1) initiating the operation of said operating system;
  2) opening said first valve means for a first selected time period to supply pressurized cleaning liquid to said fluid supplying means;
  3) closing said first valve means when said pressurized cleaning liquid has been supplied for said first selected time period;
  4) opening said second valve means for a second selected time period to supply pressurized drying fluid to said fluid supplying means;
  5) closing said second valve means when said pressurized drying fluid has been supplied for said second selected time period; and
  6) stopping the operation of said operating means.

15. A sealing structure in accordance with claim 14 and further including the step of
  inserting a first selected time delay between steps (1) and (2) to permit the stopping of the operation of said operating system.

16. A sealing structure in accordance with claim 14 and further including the step of
  inserting a second selected time delay between steps (3) and (4).

17. A sealing structure in accordance with claim 14 and further including the step of
  supplying after step (5) an indication that the closing of said second valve means has occurred.

18. A sealing structure in accordance with claim 1 wherein said fluid supplying means supplies said jets of pressurized fluid in a pulsed manner.

* * * * *